US011956582B2

(12) United States Patent
Hadersbeck et al.

(10) Patent No.: US 11,956,582 B2
(45) Date of Patent: Apr. 9, 2024

(54) MICROPHONE ALIGNMENT DEVICE

(71) Applicant: Hadersbeck & Associates, LLC, Englewood, CO (US)

(72) Inventors: Chad Hadersbeck, Englewood, CO (US); Adam Zimmer, Denver, CO (US)

(73) Assignee: Hadersbeck & Associates, LLC, Englewood, CO (US)

( * ) Notice: Subject to any disclaimer, the term of this patent is extended or adjusted under 35 U.S.C. 154(b) by 53 days.

(21) Appl. No.: 17/698,740

(22) Filed: Mar. 18, 2022

(65) Prior Publication Data

US 2022/0303656 A1 Sep. 22, 2022

Related U.S. Application Data

(60) Provisional application No. 63/163,259, filed on Mar. 19, 2021.

(51) Int. Cl.
*H04R 1/08* (2006.01)
*H04R 1/34* (2006.01)

(52) U.S. Cl.
CPC ............. *H04R 1/083* (2013.01); *H04R 1/342* (2013.01)

(58) Field of Classification Search
CPC ........... H04R 1/08; H04R 1/083; H04R 1/342
USPC .................................................. 381/360–368
See application file for complete search history.

(56) References Cited

U.S. PATENT DOCUMENTS

| | | | | |
|---|---|---|---|---|
| 3,928,734 A * | 12/1975 | Noury, Jr. | H04R 1/08 | 381/364 |
| 4,771,454 A * | 9/1988 | Wilcox, Jr. | H04R 5/0335 | 379/430 |
| 7,496,208 B2 | 2/2009 | Uchimura | | |
| 8,948,434 B2 | 2/2015 | Godfrey | | |
| 9,118,989 B2 | 8/2015 | Zukowski | | |
| 10,540,139 B1 * | 1/2020 | Janes | G10K 15/02 | |
| 2009/0175480 A1 * | 7/2009 | Zhou | H04R 1/1058 | 381/375 |

OTHER PUBLICATIONS

Head/Neck Band Strap Boom Microphone, web page <https://ixradio.com/shop/index.php?route=product/product&product_id=103>. last visited Mar. 14, 2022.

* cited by examiner

*Primary Examiner* — Katherine A Faley
(74) *Attorney, Agent, or Firm* — University of Colorado Entrepreneurial Law Clinic

(57) ABSTRACT

The present application is directed to an alignment device suited for use with a microphone. The device may include an end that is configured to contact a user's face, an attachment portion, with the attachment portion having an attachment piece configured to attach to a microphone. The device also can include a tendril extending between the end and the attachment portion. The tendril can extend along a length of the microphone to a point past a grille of the microphone. The end can be offset from the grille to maintain the user's face a distance from the grille.

19 Claims, 6 Drawing Sheets

23

31

MICROPHONE ALIGNMENT DEVICE

CROSS REFERENCE TO RELATED APPLICATIONS

This application claims the benefit of U.S. Provisional Patent Application No. 63/163,259, filed on Mar. 19, 2021, the contents of which are herein incorporated by reference in their entirety.

TECHNICAL FIELD

Embodiments of the present disclosure generally relate to microphones and devices that may enable users to use microphones; and more specifically to devices that may help a user align themselves with a microphone.

BACKGROUND

If a user holds a microphone too close to their face, bodily fluids may get on the microphone and the microphone may not adequately receive sound coming from the user. If a user holds a microphone too far from their face, the microphone may not adequately pick up sound coming from the user.

SUMMARY

The disclosure includes microphone alignment devices, which in some embodiments can include an end configured to contact a user's face and an attachment portion. The attachment portion can have an attachment piece configured to attach to a microphone. A tendril can extend between the end and the attachment portion. The tendril can be configured to extend along a length of the microphone to a point past a grille of the microphone when the attachment piece is coupled to the microphone. The end can be offset from the grille when the attachment piece is attached to the microphone. A maximum longitudinal cross sectional area of the end can be greater than a maximum longitudinal cross sectional area of the tendril.

In some embodiments, the attachment piece is configured to removably attach to the microphone.

In some embodiments, the attachment piece is configured to adjustably attach to the microphone.

In some embodiments, at least a portion of the tendril is comprised of flexible material.

In some embodiments, a distance between the end and the grille is adjustable by flexing the tendril.

In some embodiments, the end comprises a bulge, the bulge having a cross sectional area larger than a maximum cross sectional area of the tendril along a length of the tendril.

In some embodiments, the bulge defines a rounded shape.

In some embodiments, the surface area of the bulge is less than eight square inches.

In some embodiments, a portion of the tendril interacting with the attachment piece is thicker than a different portion of the tendril.

In some embodiments, the tendril is coupled to the attachment piece such that the tendril can be moved along a length of the microphone to change a distance between the end and the grille.

In some embodiments, the tendril comprises a measurement indicator to allow a user to visually identify how far the tendril extends past the microphone grille.

The disclosure includes microphone alignment devices, which in some embodiments can include an attachment piece configured to attach to a microphone. A tendril can extend from the attachment piece. The tendril can have a curvature configured to maintain a spaced configuration with respect to a grille of the microphone when the attachment piece is attached to the microphone. The tendril can terminate in a bulge configured to interface with a user's face. The bulge can be situated proximally of the grille when the attachment piece is attached to the microphone and configured to make contact with the user's face at a distance from the microphone grill. A maximum longitudinal cross sectional area of the end can be greater than a maximum longitudinal cross sectional area of the tendril.

In some embodiments, the tendril has a curvature configured to maintain a spaced configuration with respect to the grille of the microphone without touching the grille when the attachment piece is attached to the microphone.

In some embodiments, the bulge defines a rounded shape and the surface area of the bulge is less than eight square inches.

In some embodiments, at least a portion of the tendril is comprised of flexible material.

In some embodiments, the tendril is coupled to the attachment piece such that the tendril can be moved along a length of the microphone to change a distance between the end and the grille.

In some embodiments, the attachment piece is configured to removably attach to the microphone.

In some embodiments, the attachment piece is configured to attach to various different cross sectional areas of the microphone.

In some embodiments, the tendril is cylindrical.

The disclosure includes microphone alignment devices, which in some embodiments can include an end configured to interface with a user's face. An attachment portion, can have an attachment piece configured to attach to a microphone. The microphone can have a centerline, a first perimeter, and a second perimeter. The first perimeter can define the widest cross section of a grille of the microphone. The second perimeter can define a shape that at any given point is twice the distance from the centerline as a corresponding point on the first perimeter. A tendril can extend at least between the end and the attachment piece. The tendril can extend along a length of the microphone such that the end of the tendril is located at a point past the grille of the microphone. The end can terminate in a position between the centerline and the second perimeter when the attachment piece is attached to the microphone.

These and other features and aspects of various examples may be understood in view of the following detailed discussion and accompanying drawings.

DETAILED DESCRIPTION

Figure 1:
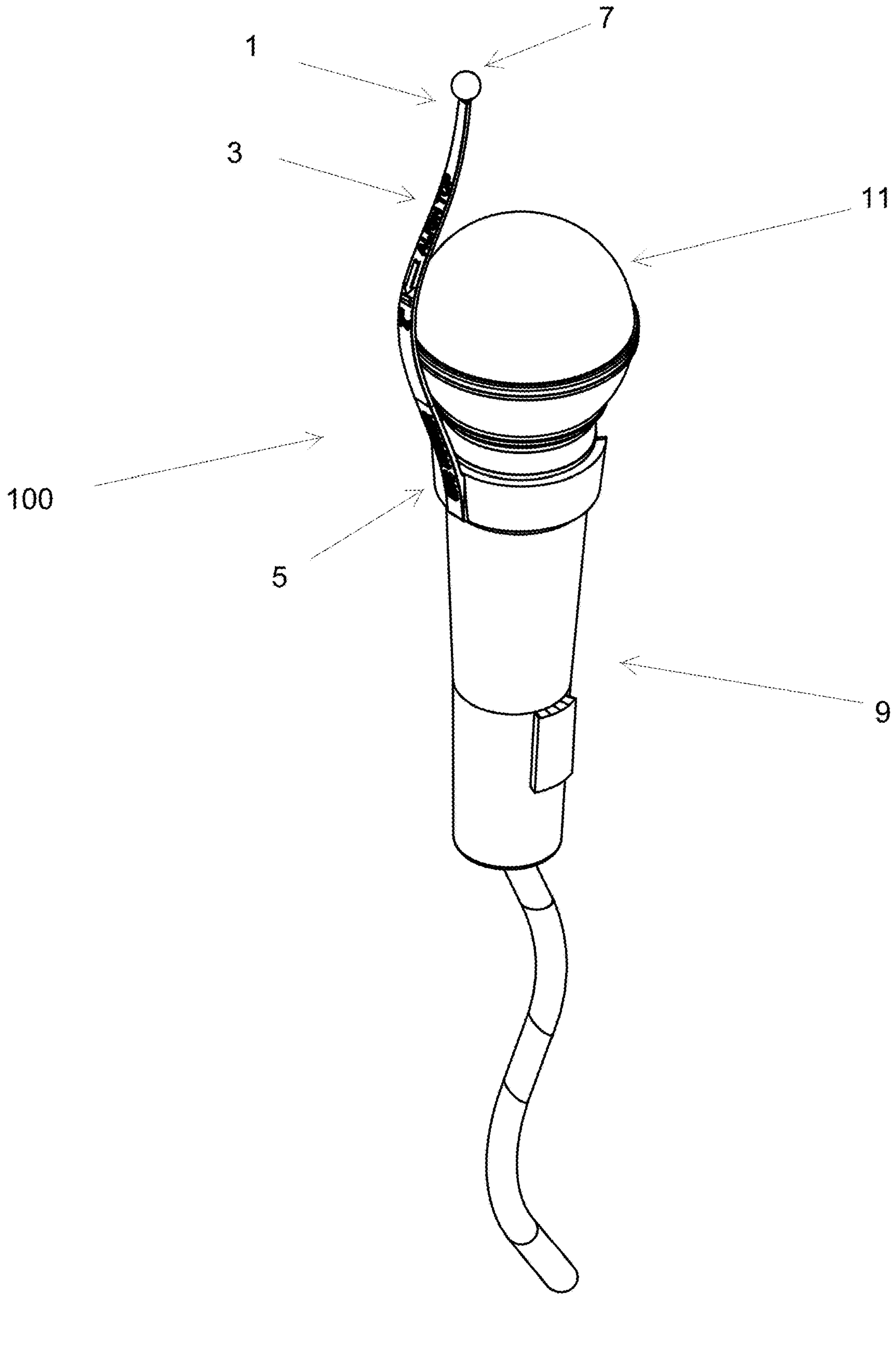
FIG. 1 shows a microphone alignment device mounted to a microphone, according to one embodiment.

FIG. 1 shows an example of a microphone alignment device 100 coupled to a microphone 9. In one embodiment of the device 100, a tendril 3 comprises an end 1 that couples to a bulge 7 that is designed to help position a user's mouth with respect to the microphone 9. The microphone alignment device 100 can include an attachment piece 5 that couples the alignment device 100 to the microphone 9. When the device 100 is coupled to the microphone 9, the device 100 may allow a user to easily position themselves in a desirable position with respect to the microphone 9. A user may engage with the device 100 by moving their face towards the microphone 9 until the user contacts the bulge 7. The device 100 can be situated such that contacting the bulge 7 will communicate to the user that the user's face is in a desirable position for singing. Often, inexperienced users of microphones will position their mouth too close or too far from the microphone, resulting in poor audio transmission into the microphone. The device 100 may help alleviate these issues by facilitating the user in positioning their mouth in a desired location relative to the microphone.

The attachment piece 5 can be configured to attach to around many different parts of the microphone 9, so that a user of the microphone 9 with the device 100 attached can select the most convenient position to attach the device 100. The user can select where to attach the device 100 to provide for easier hand placement, better positioning of the end 1, a more secure attachment of the device 100, or for any other reason that the user may consider. The attachment piece 5 is also coupled with the tendril 3 so that when the attachment piece 5 is attached to the microphone 9, the tendril 3 is also coupled to the microphone 9 and will remain in a stable position relative to the microphone. When the tendril is coupled to the attachment piece 5 and the attachment piece 5 is also coupled to the microphone 9, the tendril 3 then extends along a length of the microphone 9 towards the microphone grille 11.

The tendril 3 may extend past the grille 11 and the end 1 of the tendril 3 terminates at a point that may be past the grille 11. Thus, when a user attaches the device 100 to the microphone 9, the end 1 is able to be positioned at a point that is convenient for a user to position their mouth in a desirable position with respect to the microphone 9, to allow for the desired transmission of the user's voice into the microphone's audio receiving mechanism.

Figure 2:
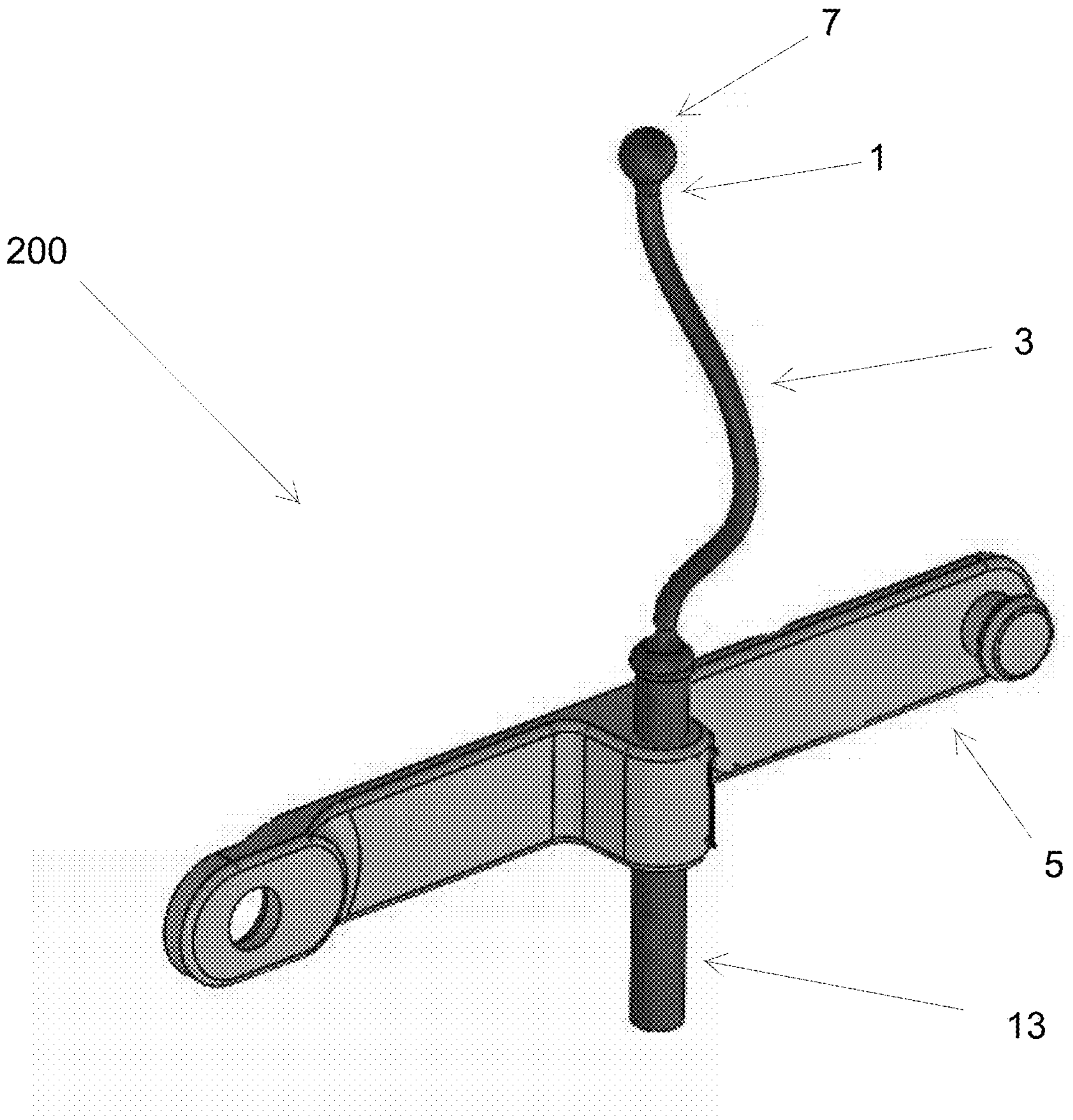
FIG. 2 shows a microphone alignment device according to another embodiment.

FIG. 2 shows another embodiment of a microphone alignment device 200. In one embodiment, the tendril 3 terminates in an end 1. The end 1 can be used by a user as a means of haptic feedback to allow the user to position their mouth in a desired location with respect to a microphone. The user may engage the end 1 by moving toward the microphone until a portion of their face contacts the end 1. Engaging with the end 1 allows a user to receive physical feedback from the device and rely on this physical feedback to determine if the user is in a desirable position with respect to the microphone. In some cases, the user may not contact the end 1, but may use it as a visual cue to determine a desirable position for their mouth with respect to the microphone. The end 1 may have shape that is consistent with the rest of the tendril 3.

In one embodiment, the end 1 of the tendril 3 is coupled to a bulge 7. The bulge 7 can be configured to provide a comfortable contact point between the user and the device 200. The bulge can be made of any material that will provide a comfortable contact point, including foam, natural rubber, EPDM, carbon, or the like. The bulge may be manufactured separately from the tendril 3 and end 1 or it may be manufactured integrally with the tendril 3 and end 1. The bulge 7 can assume various shapes including globular, cubical, ellipsoidal, or any other form. In one embodiment, the bulge 7 is small enough to fit within the area between the user's mouth and the bottom of the user's chin when the device 200 is employed by the user. Such a position may be desirable so that the bulge 7 does not obstruct any sound coming from the user. In another embodiment, the bulge 7 can be shaped so that the user can position the bulge 7 below the mouth, and the bulge 7 may extend below the user's chin. The shape of the bulge 7 can be selected in order to allow for easier use of the device 200, more comfort to the user, easier manufacturing, or other relevant considerations.

In one embodiment, the tendril 3 extends between the attachment piece 5 and the bulge 7. The tendril may extend past the attachment piece 5 in the opposite direction of the end 1 or bulge 7. Manipulation of the tendril 3 is one of the main ways to position or reposition the location of the end 1 or bulge 7. The tendril 3 can be comprised of plastic, metal, foam, or the like. The tendril 3 can also comprise multiple materials.

In another embodiment, the tendril 3 is in a curved configuration and defines a bend between the attachment piece 5 and the end 1. The microphone may be shaped such that the end 1 of the tendril 3 cannot be positioned in a desirable location with respect to the microphone grille 11 unless the tendril 3 is curved, due to protrusion of the grille 11 or protrusion of other components of the microphone. To achieve a curved configuration, the tendril 3 can be manufactured with a curve or the tendril 3 can be manipulated into a curved configuration by the user, given the material of construction of the tendril 3. The proper curved configuration may vary depending on the microphone or depending on other user preferences. For example, it may be desirable for the tendril 3 to position the end 1 in its preferred location without the tendril 3 contacting the microphone. The curved configuration may also be selected to accommodate the user's hand or the curved configuration may be adjusted based on other factors relevant to allowing comfortable use of the device 200 by the user. The tendril 3 may also contact the microphone at various points based on similar considerations, or in order to achieve the desired position of the end 1.

In some embodiments, as seen in FIG. 1, the tendril 3 can be comprised of a rigid material. The tendril 3 may maintain its shape when force is applied to it in such an embodiment. As a result, in order to achieve a desirable position of the end 1 with respect to the microphone 9, the tendril 3 may need to be manufactured based on specifications of an intended microphone. Alternatively, the desirable position of the end 1 may be achieved by including an attachment piece 5 that allows for adjusting the position of the tendril 3 with respect to a microphone, as described in more detail below.

Figure 3B:
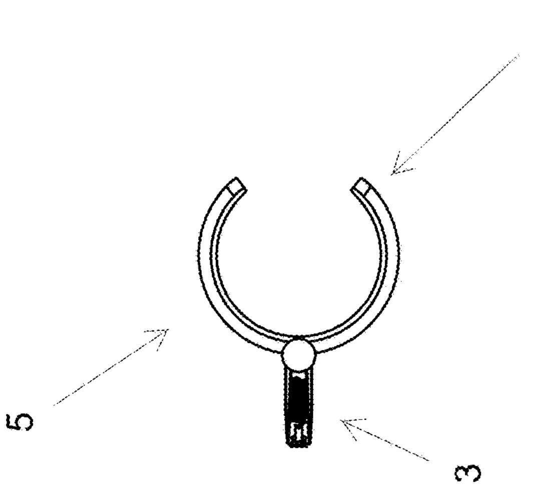
FIGS. 3A, 3B and 3C show different embodiments of the attachment piece.
Figure 3A:
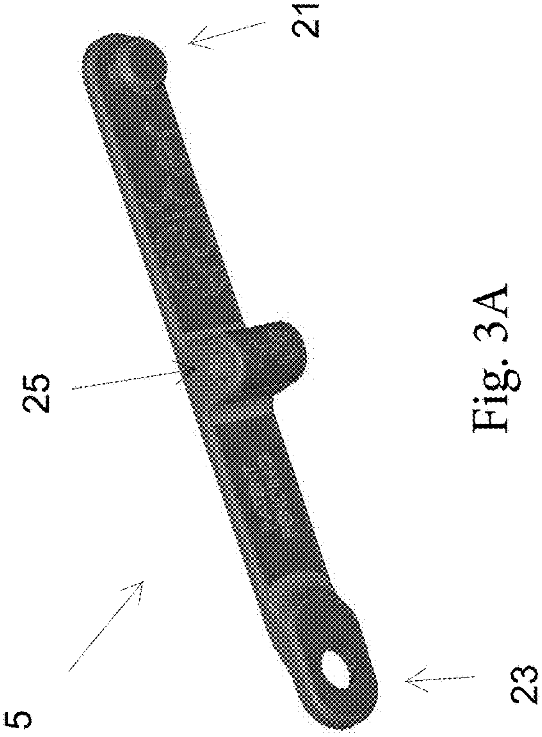
Figure 3C:
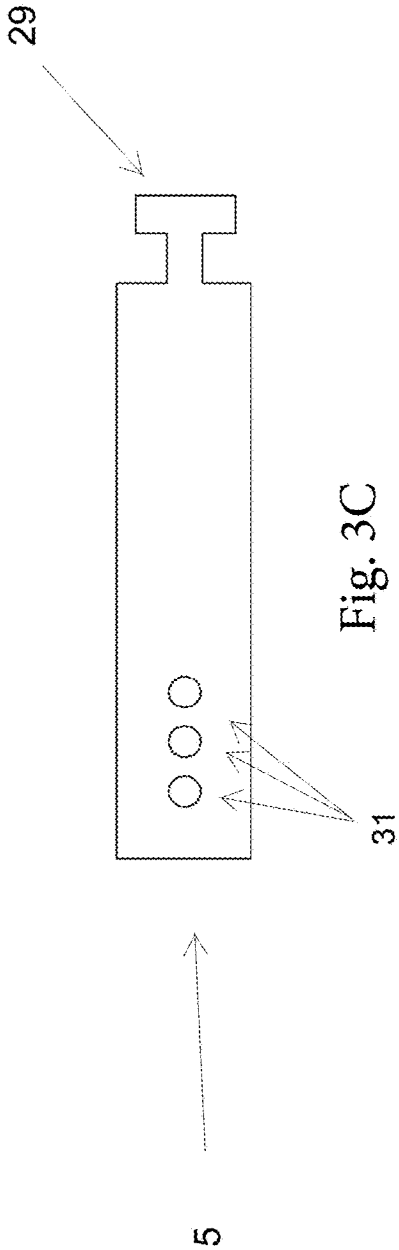

As seen in FIGS. 3A-3C, multiple configurations of the attachment piece 5 are possible. In one embodiment the attachment piece 5 is configured to attach to a microphone. By attaching to the microphone the attachment piece 5 allows a user to secure the device 200 to the microphone. The attachment piece 5 also couples to the tendril 3 to maintain the tendril 3 in a desired position, or in any other position, relative to the microphone. This allows a user to maintain an appropriate position of a microphone alignment device (e.g., microphone alignment devices 100, 200) with respect to the microphone, and may also allow the user to maintain the end 1 or bulge 7 in a desired position with respect to the microphone or grille 11.

The attachment piece 5 can configured to attach to around many different parts of a microphone, which may have different thicknesses, so that a user of a microphone with the device 100 attached can select the most convenient position to attach the device 100.

In another embodiment, the attachment piece 5 can adjustably attach to a microphone. This may allow the attachment piece 5 to attach to a microphone 9 that has different thicknesses along the length of the microphone. This may also allow a user to attach the device 200 with different amounts of force, depending on user preference. The attachment piece can be adjustably attachable through various methods. In one embodiment, seen in FIG. 3A, the attachment piece 5 comprises elastic material so that one configuration of the attachment piece 5 can attach to locations having different thicknesses. In another embodiment, the attachment piece 5 can comprise hook and loop fasteners. In another embodiment, shown in FIG. 3C, the attachment piece 5 comprises a male end 29 and female end 31. The attachment piece 5 may have several female ends 31 allowing the user to select a female end 31 giving the attachment piece 5 a desired perimeter for a microphone. As seen in FIG. 3B, the attachment piece may also define a shape approximating an incomplete circle 27, to allow the attachment piece 5 to couple to various thicknesses of a microphone while the attachment piece 5 comprises a more rigid material. Various other means of allowing the attachment piece 5 to attach to various thicknesses with various strengths are available.

In another embodiment, the device 200 may be used with a microphone 9 with the attachment piece 5 attached to something other than the microphone, such as a microphone stand, a microphone accessory, or any other location that a user would find convenient to attach the device 200 to.

In another embodiment, for example in FIGS. 3A and 3C, the attachment piece 5 is separable from the tendril 3. The tendril 3 can be coupled with the attachment piece 5 via friction, magnets, hook and loop fasteners, buttons, snaps, or the like.

FIG. 3A shows an embodiment where the tendril 3 may be coupled with the attachment piece 5 by inserting the tendril 3 into an opening 25 in the attachment piece 5. The tendril 3 can be maintained in place with respect to the attachment piece 5 via friction between the tendril 3 and opening 25.

As seen in FIGS. 2 and 3A, the tendril 3 may comprise a thicker portion 13 that can be inserted into the opening 25 of the attachment piece 5, allowing for better coupling between the two components. The tendril position is maintained in this embodiment through friction. The thicker portion 13 of the tendril 3 is along a length of the tendril 3 such that the tendril 3 can be coupled to the attachment piece 5 using various portions of the tendril 3. In this configuration, the tendril can be moved with respect to the attachment piece to allow for the bulge 7 to be repositioned based on the user's preference. By translating the tendril 3 with respect to the attachment piece 5, the entire length of the tendril 3 can change position relative to the attachment piece 5 or microphone, and thus the location of the end 1 or bulge 7 can also be changed relative to the attachment piece 5 or microphone.

In another embodiment, seen in FIG. 3B, the attachment piece 5 is made integrally with the tendril 3. This may allow for ease of manufacturing, increased overall stability of the device 200, and easier modulation of the location of the end 1 or bulge 7.

Figure 4A:
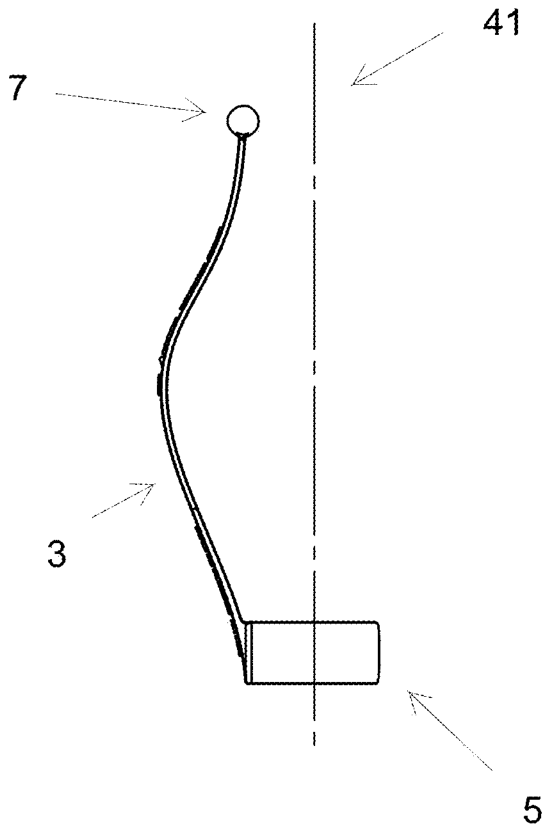
FIGS. 4A and 4B show different configurations of the tendril.
Figure 4B:
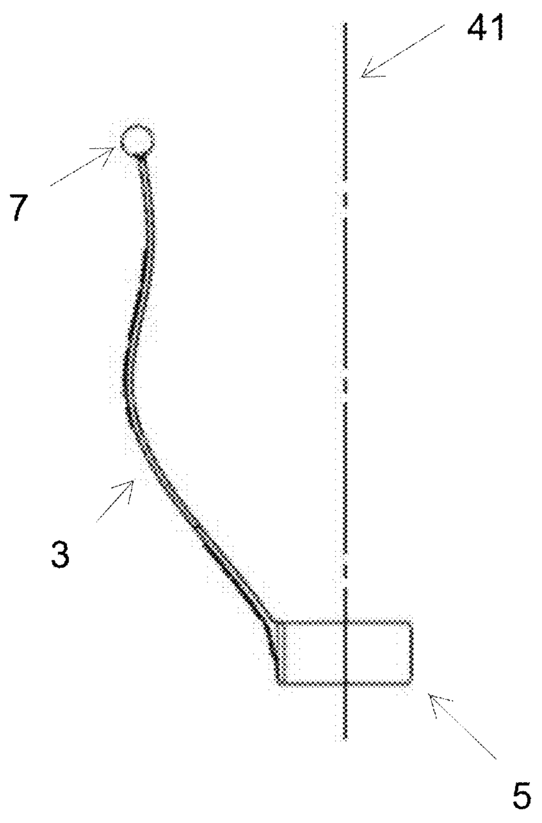

FIGS. 4A and 4B show an embodiment where the tendril 3 can comprise flexible material. Using flexible material can allow for more comfortable use from a user. For example, when a user engages with the end 1 or bulge 7, if the tendril 3 comprises flexible material the tendril 3 can absorb some of the force that the user applies to the end 1 or bulge 7 and thus the end 1 or bulge 7 will exert less force on the user. Additionally, incorporating flexible material into the tendril 3 may allow the device 200 to more easily remain attached to a microphone or may allow the device 200 to better maintain its position relative to the microphone. For example, since the flexible material in the tendril 3 can absorb some of the force that the user applies to the device 200, the attachment piece 5 may experience less force from the user which can help prevent the attachment piece 5 from becoming disconnected or from sliding or otherwise shifting with respect to the microphone. Flexible material can also allow a user to selectively shape the tendril 3 to conform to a desired position. For example, the tendril 3 can be shaped to accommodate the shape of the microphone, to more easily achieve the desired position of the end 1 or bulge 7, or to allow maximum user comfort. The curve of the tendril 3 can be configured in a shape to have a similar or in some cases a matching profile to the exterior of the grille, thus causing the minimal distance between the grille and tendril to be substantially equal across the perimeter of the grille relative to the surface of the tendril 3. Further, the curve of the tendril 3 can be designed to otherwise accommodate the shape of the microphone. As seen in FIGS. 4A and 4B, the user may flex the tendril 3 along its length in order to position the tendril 3 and bulge 7 at various distances from the centerline 41 of the microphone.

Figure 5:
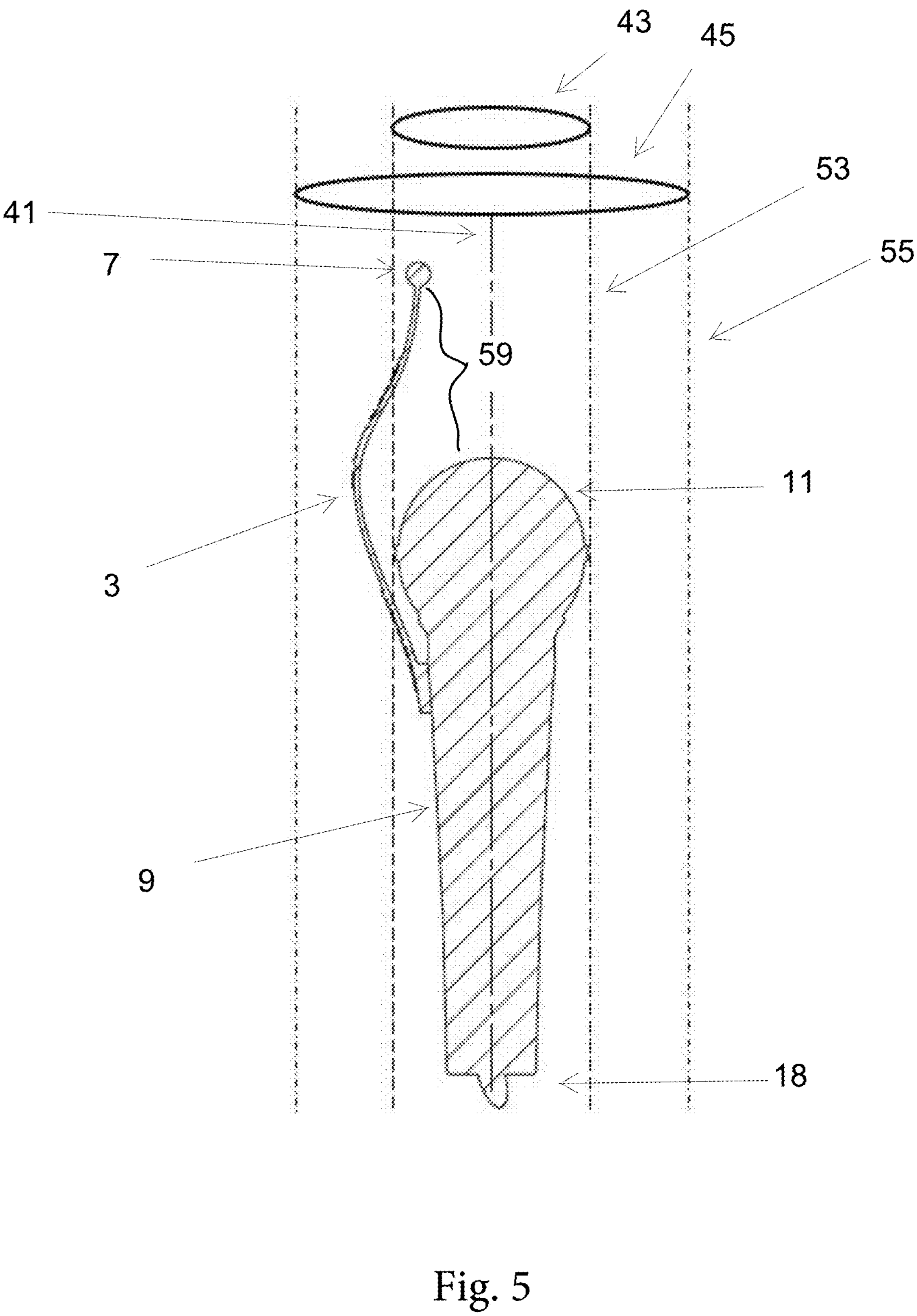
FIG. 5 shows a cross-section view of the microphone alignment device from FIG. 1, and further shows different geometrical aspects of the microphone that may be relevant to positioning of the microphone alignment device.

As seen in FIG. 5, in one embodiment, the or bulge 7 is located a distance 59 from the grille 11 to allow for adequate audio transmission to the microphone 9 from the user. Various microphones can be employed with the device 200, including cardioid microphones, omnidirectional microphones, and the like. Different types of microphones have different directionality and ability to pick up audio from an audio source. The device 200 can be used to position the or bulge 7 in various positions with respect to the microphone 9 to enable proper audio transmission into the microphone 9. This helps avoid audio transmission issues, such as plosives and the like that can arise from improper alignment with a microphone due to the proximity effect, the inverse square law, and similar principles. Maintaining an appropriate distance 59 from the microphone can also help a user limit exposure to bacteria and other contaminants on the microphone that may arise from previous users, and can help future users avoid similar issues.

With respect to the positioning of the device 200 discussed below, the longitudinal length of the microphone is defined as the length that extends from the base 18 of the microphone to the microphone's grille 11. The centerline 41 defines the line that extends from the center of the base 18 of the microphone through the center of the microphone grille 11, along the longitudinal length. The longitudinal axis extends in the same direction as the centerline 41. The orthogonal axis is defined as any direction extending at a 90 degree angle from the longitudinal axis. For example, assuming a cartesian coordinate system, if the longitudinal axis defines the x-axis, an orthogonal direction would be along either the y-axis, the z-axis, or some other point along the y-z plane.

In one embodiment, the microphone 9 has a centerline 41 that runs along a longitudinal length of the microphone 9. The microphone will have a first perimeter 43, which defines the widest cross section of the microphone grille 11. In this example, the centerline 41 extends orthogonally from the first perimeter 43 that defines the widest cross section of the grille 11. A second perimeter 45 exists in the same plane as the first perimeter 43. At any point along the second perimeter 45, there is a corresponding point on the first perimeter 43 that is connected by a straight line extending from the centerline 41 through, and past, the first perimeter 43. Points along the second perimeter 45 are twice the distance from the centerline 41 as corresponding points on the first perimeter 43 are.

The first perimeter 43 and second perimeter 45 can help define a desirable location of the end 1 or bulge 7. If the first perimeter 41 and second perimeter 45 are projected along the longitudinal length of the microphone, there will be two concentric three dimensional projections extending along the longitudinal length of the microphone 9. The projection of the first perimeter 43 is the first projection 53. The projection of the second perimeter 45 is the second projection 55. For example, if the first and second perimeters 43 and 45 define a circle, the projections (53 and 55) of the first and second perimeters will define two concentric cylinders along the longitudinal length of the microphone.

Depending on the microphone 9, the desirable orthogonal position of the end 1 or bulge 7 can be at various positions along the orthogonal plane. A desirable position of the end 1 or bulge 7 may be between the centerline and the first projection 53. The desirable position may also be between the first projection 53 and second projection 55. The desirable position may also be at a point outside of the second projection 55. A user can position the end 1 or bulge 7 at various points along the orthogonal plane by choosing different locations to attach the attachment piece 5, by translating the tendril 3 relative to the attachment piece 5, by flexing the tendril 3 along its length, by manufacturing the tendril 3 in a different configuration, or by other methods of manipulating or altering the device 200.

Depending on the microphone 9, the desirable longitudinal position of the end 1 or bulge 7 can also be at various positions along the longitudinal plane. Along the longitudinal axis, the desirable position may be on either side of the grille 11 or at a longitudinal position similar to the grille 11. A user can position the end 1 or bulge 7 at various points along the longitudinal plane by choosing different locations to attach the attachment piece 5, by translating the tendril 3 relative to the attachment piece 5, by flexing the tendril 3 along its length, by manufacturing the tendril 3 in a different configuration, or by other methods of manipulating or altering the device 200.

Figure 6:
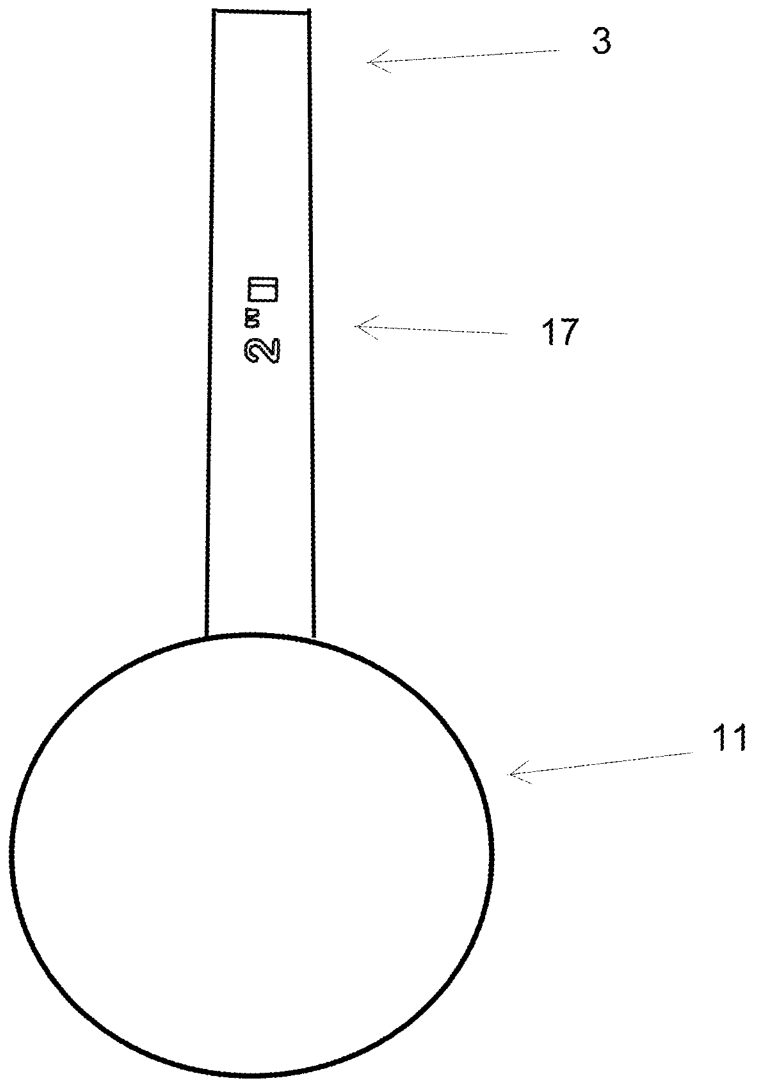
FIG. 6 shows an embodiment of the microphone alignment device where the tendril includes measurement indicators along its length.

FIG. 6 shows another embodiment where the tendril 3 can comprise measurement indicators 17. Measurement indicators 17 can be utilized by the user to ensure that the end 1 or bulge 7 is an appropriate distance from the microphone 9 or grille 11. For example, if a user desires the end 1 or bulge 7 to be a certain distance from the grille 11, the user may rely on measurement indicators 17 on the tendril 3 to determine how far the end 1 or bulge 7 is from the grille 11 and adjust the device 200 accordingly.

The device 200 may be manufactured with various methods, including injection molding, thermosetting, 3D printing, casting, rotational molding, vacuum forming, blow molding, welding, machining, cutting, or the like. Various components of the device 200, such as the end 1, bulge 7, tendril 3 and attachment piece 5 may be manufactured using different processes based on considerations relevant to a manufacturer or producer. Various components of the device 200 may also be manufactured in the same process. Various components of the device 200 may also be manufactured integrally.

What is claimed is:

1. An alignment device for use with a microphone, comprising:
- a bulge configured to contact a user's face at or above a bottom of the user's chin,
- an attachment portion,
  - the attachment portion having an attachment piece configured to attach to the microphone,
- a tendril extending between the bulge and the attachment portion; wherein:
  - the tendril is configured to extend along a length of the microphone to a point past a grille of the microphone when the attachment piece is coupled to the microphone;
  - the bulge is offset from the grille when the attachment piece is attached to the microphone; and
  - a maximum longitudinal cross sectional area of the bulge is greater than a maximum longitudinal cross sectional area of the tendril, wherein when the microphone and the bulge are in use the bulge is configured to move with the microphone, independently of the user's face, as the user moves the microphone to cause contact of the bulge with the user's face at or above the bottom of the user's chin.

2. The alignment device of claim 1, wherein the attachment piece is configured to removably attach to the microphone.

3. The alignment device of claim 1, wherein the attachment piece is configured to attach to multiple cross sectional areas of the microphone.

4. The alignment device of claim 1, wherein at least a portion of the tendril is comprised of flexible material.

5. The alignment device of claim 4, wherein a distance between the bulge and the grille is adjustable by flexing the tendril.

6. The alignment device of claim 1, wherein the bulge defines a rounded shape.

7. The alignment device of claim 6, wherein a surface area of the bulge is less than eight square inches.

8. The alignment device of claim 1, wherein a portion of the tendril interacting with the attachment piece is thicker than a different portion of the tendril.

9. The alignment device of claim 1, wherein the tendril is coupled to the attachment piece such that the tendril can be moved along the length of the microphone to change a distance between the bulge and the grille.

10. The alignment device of claim 1, wherein the tendril comprises a measurement indicator to allow a user to visually identify how far the tendril extends past the grille.

11. An alignment device for use with a microphone, the alignment device comprising:
- an attachment piece configured to attach to the microphone;
- a tendril extending from the attachment piece,
- the tendril having a curvature configured to maintain a spaced configuration with respect to a grille of the microphone when the attachment piece is attached to the microphone,
- the tendril terminating in a bulge configured to interface with a user's face at or above a bottom of the user's chin, the bulge situated proximally of the grille when the attachment piece is attached to the microphone and configured to contact the user's face at a distance from the grille, wherein when the microphone and the bulge are in use, the bulge is configured to move with the microphone, independently of the user's face, as the user moves the microphone to cause contact of the bulge with the user's face at or above the bottom of the user's chin, and wherein a maximum longitudinal cross sectional area of the bulge is greater than a maximum longitudinal cross sectional area of the tendril.

12. The alignment device of claim 11, wherein the curvature of the tendril is configured to maintain a space between the tendril and the grille when the attachment piece is attached to the microphone.

13. The alignment device of claim 11, wherein the bulge defines a rounded shape and a surface area of the bulge is less than eight square inches.

14. The alignment device of claim 11, wherein at least a portion of the tendril is comprised of flexible material.

15. The alignment device of claim 11, wherein the tendril is coupled to the attachment piece such that the tendril can be moved along a length of the microphone to change a distance between the bulge and the grille.

16. The alignment device of claim 11, wherein the attachment piece is configured to removably attach to the microphone.

17. The alignment device of claim 11, wherein the attachment piece is configured to attach to various different cross sectional areas of the microphone.

18. The alignment device of claim 11, wherein the tendril is cylindrical.

19. An alignment device suited for use with a microphone, comprising:

a bulge configured to interface with a user's face at or above a bottom of the user's chin, an attachment portion, the attachment portion having an attachment piece configured to attach to the microphone, the microphone having a centerline, a first perimeter, a first projection, a second perimeter, and a second projection, a tendril extending at least between the bulge and the attachment piece, the tendril extending along a longitudinal length of the microphone such that an end of the tendril is located at a point past the grille of the microphone, wherein the bulge terminates in a position between the centerline and the second projection when the attachment piece is attached to the microphone, wherein when the microphone and the bulge are in use, the bulge is configured to move with the microphone, independently of the user's face, as the user moves the microphone to cause contact of the bulge with the user's face at or above the bottom of the user's chin.

* * * * *